United States Patent [19]

De Gennes

[11] 3,995,726
[45] Dec. 7, 1976

[54] CLUTCH ASSEMBLY
[75] Inventor: Gérard De Gennes, Senlis, France
[73] Assignee: Societe Anonyme Francaise du Ferodo, Paris, France
[22] Filed: Aug. 11, 1975
[21] Appl. No.: 603,683
[30] Foreign Application Priority Data
Aug. 23, 1974 France .............................. 74.28929
Aug. 1, 1975 France .............................. 75.24073
[52] U.S. Cl. ............................. 192/106.2; 64/27 C; 403/242
[51] Int. Cl.² .......................................... F16D 3/14
[58] Field of Search ..................... 192/106.2, 106.1; 64/27 C

[56] References Cited
UNITED STATES PATENTS
2,304,039  12/1942  Tower ........................... 192/106.2
3,938,635  2/1976  Davies et al. ................... 192/106.2

Primary Examiner—Benjamin W. Wyche
Attorney, Agent, or Firm—Young & Thompson

[57] ABSTRACT

A clutch assembly has a central driving plate fixed to a hub and a pair of interconnected lateral plates arranged on each side of the central plate, one of which carries friction linings. A number of corresponding windows are formed in the driving plate and in the lateral plates which receive coil springs which form a torsionally-resilient torque-transmitting connection between the central plate and the lateral plates, and the lateral plates are interconnected by integral feet formed on one or both of the plates from the material removed to form the windows therein.

20 Claims, 15 Drawing Figures

FIG.1
FIG.2
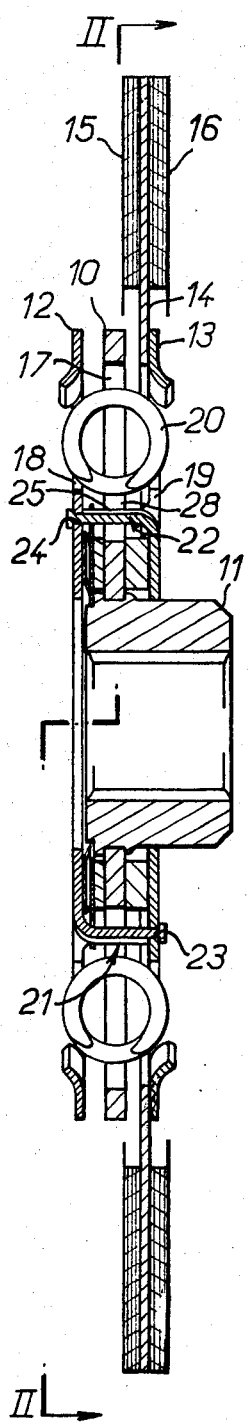
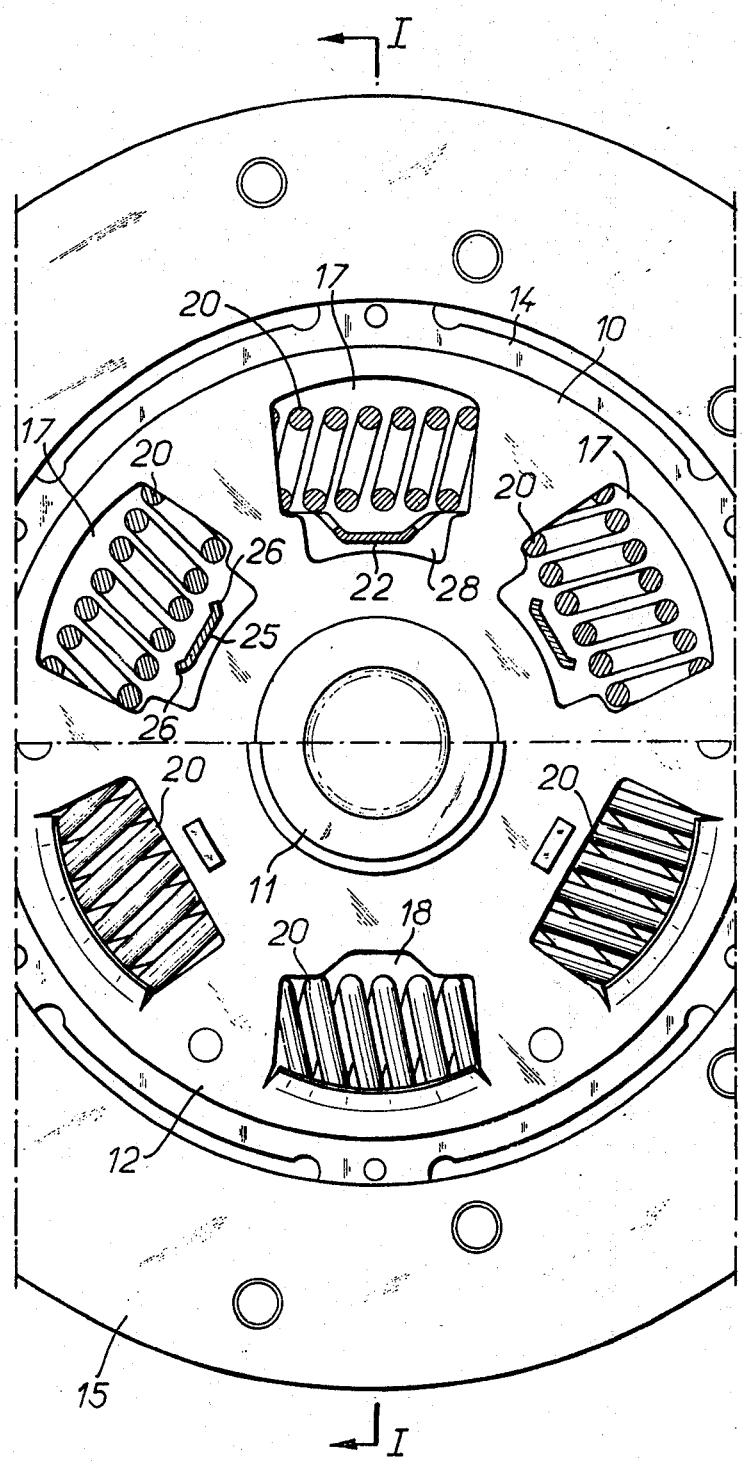

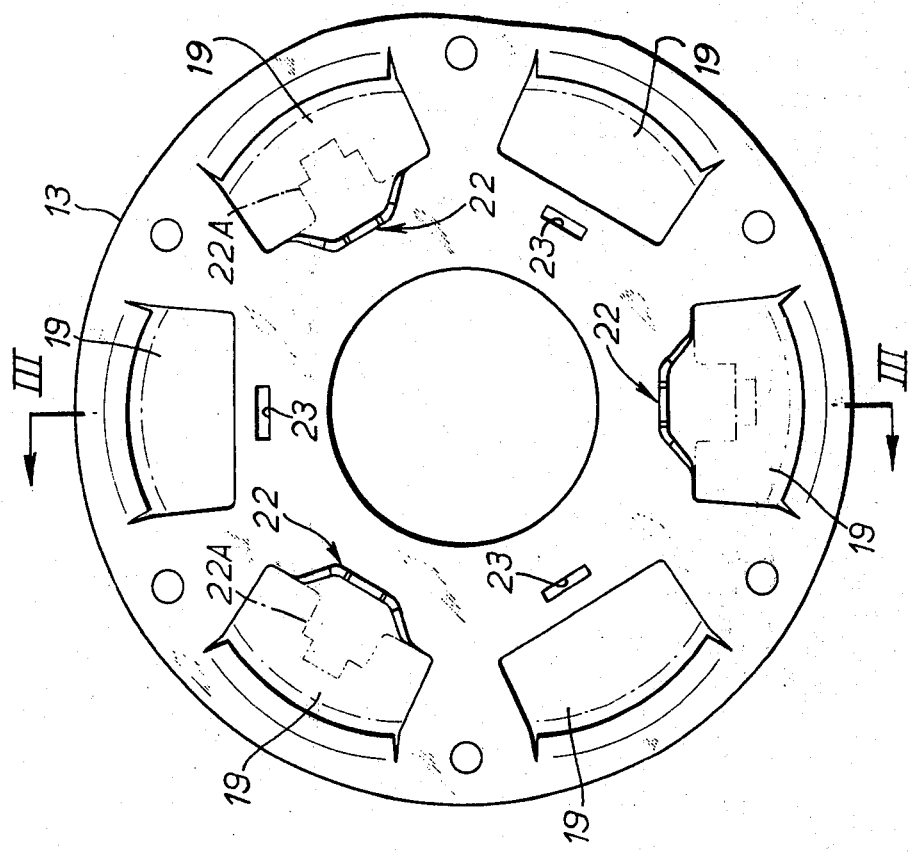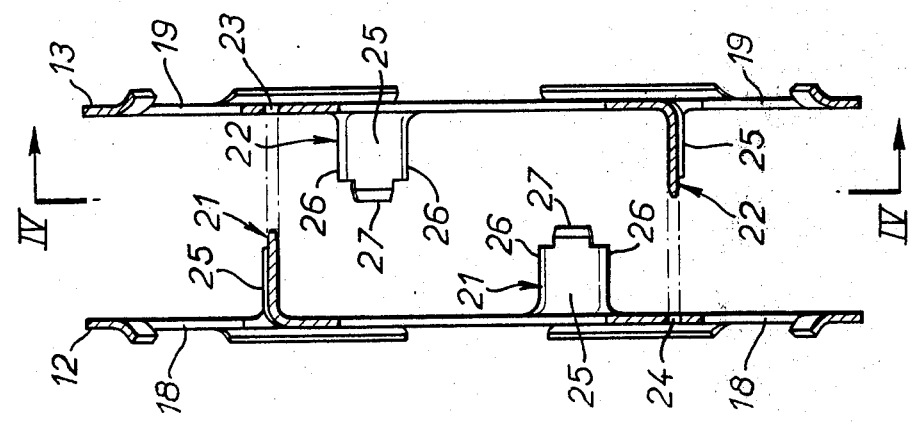

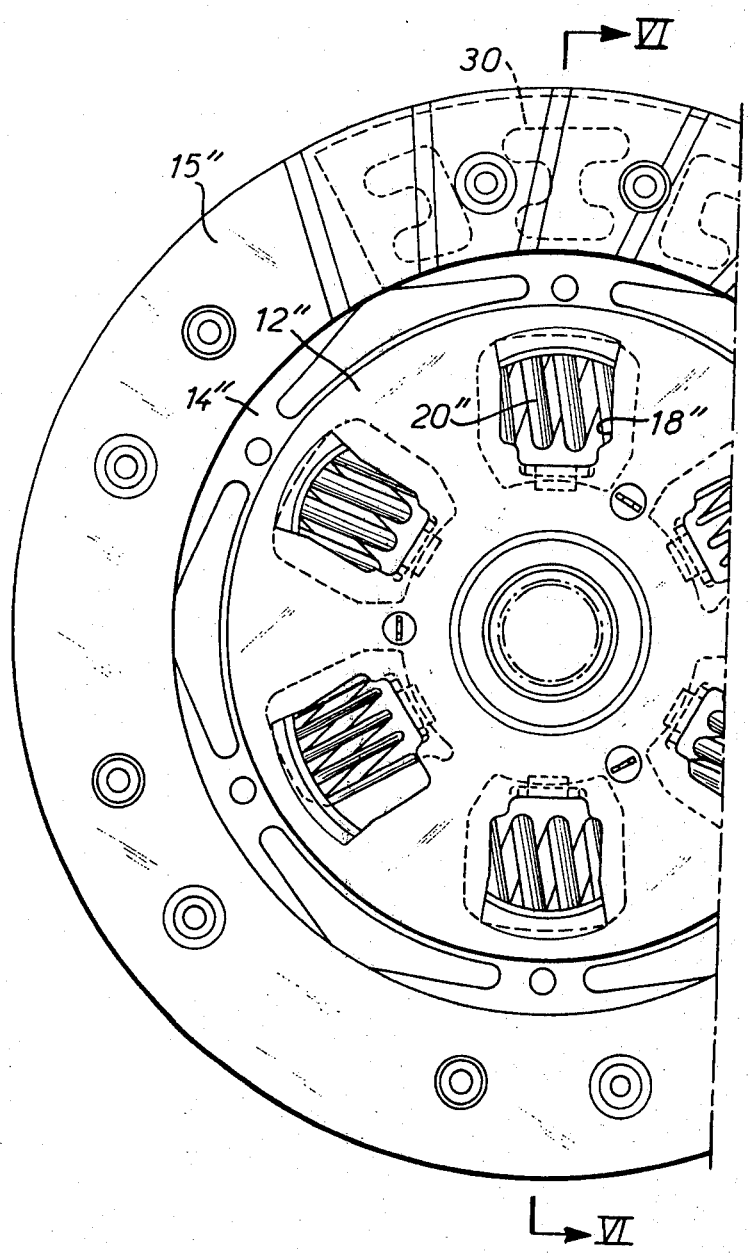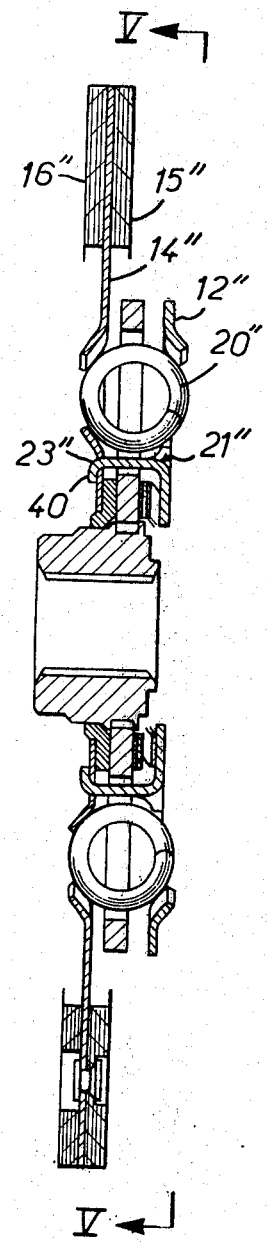

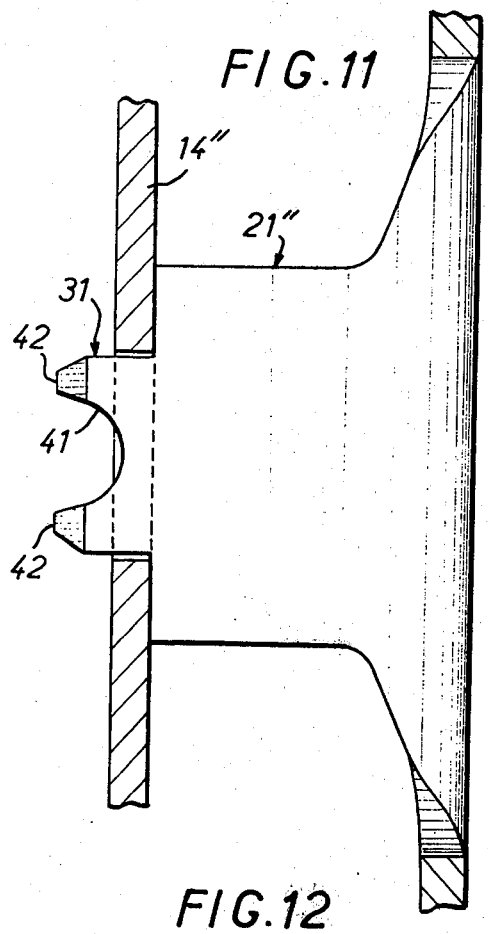
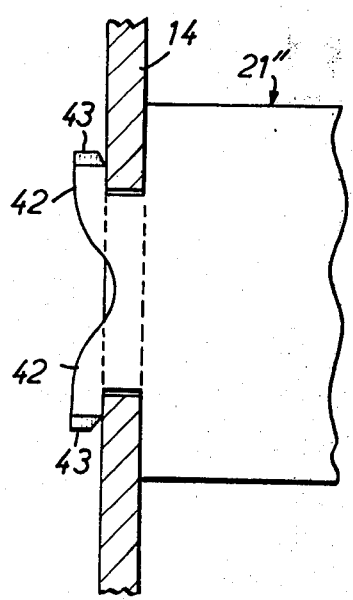
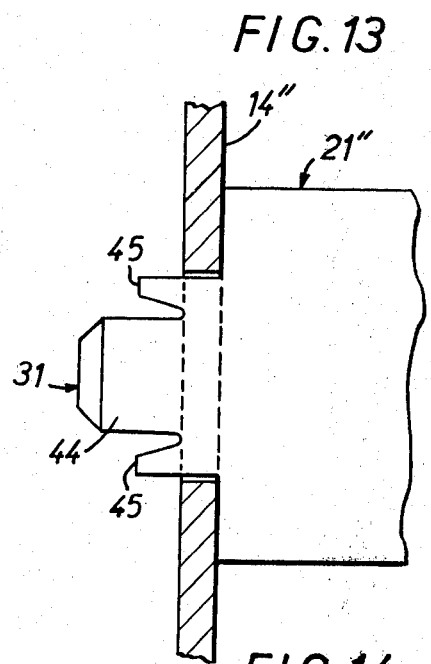
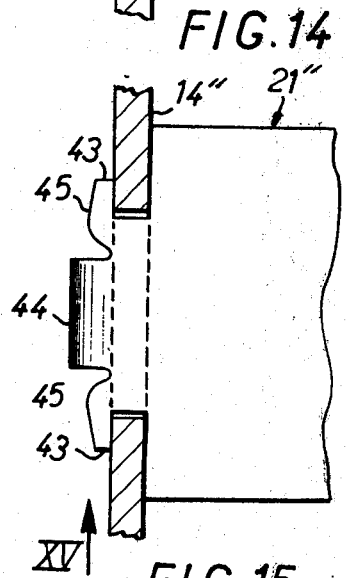
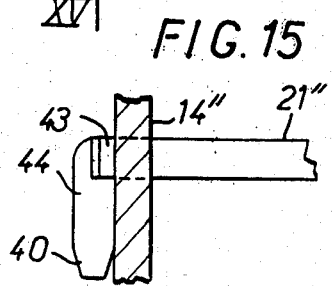

CLUTCH ASSEMBLY

BACKGROUND OF THE INVENTION

Field of the Invention

The present invention relates to a clutch assembly of the kind comprising a central plate, a pair of lateral plates disposed one on each side of the central plate, connection means connecting the lateral plates together for angular displacement relative to the central plate, a plurality of windows formed in the central plate and a plurality of corresponding windows formed in the lateral plates facing the windows in the central plate, and spring means located in said windows and forming a torsionally-resilient torque-transmitting connection between the central plate and the lateral plates.

The present invention relates more particularly to a clutch assembly of this kind in which the central plate is a driving plate fixed to a hub and one of the lateral plates carries friction linings.

It is an object of the invention to provide a clutch assembly of this kind having a particularly simple and robust construction.

SUMMARY

The invention is characterised in that the connection means connecting the lateral plates together consist of feet which are formed integrally with at least one of the lateral plates and which are engaged in the other lateral plate, the material of each foot being formed from part of the material of the plate which is removed to form one of the said windows therein. As the result of this arrangement, the construction is very simple and inexpensive, because the connection means are formed without any additional elements or material being required.

In one embodiment the feet are formed from both the lateral plates in an alternating arrangement, so that the final arrangement is symmetrical, while as an alternative the feet are provided in only one of the plates.

In a preferred embodiment, the windows of the central driving plate which receive the spring means have radial extensions towards the axis, and the feet of the lateral plates pass through these extensions in the central plate.

BRIEF DESCRIPTION OF THE DRAWINGS

FIG. 1 is a view of a clutch friction disc provided with a torsion damping device according to the invention, in a section along the line I—I in FIG. 2;

FIG. 2 is a partial view of this disc, with parts broken away, in elevation along the broken line II—II in FIG. 1;

FIG. 3 is an exploded view of the lateral plates, in a section along the line III—III in FIG. 4;

FIG. 4 is a view of one of these lateral plates, in elevation in the direction of the arrows IV—IV in FIG. 3;

FIG. 5 is a view, partly broken away, of a modified friction disc containing a device according to the invention, in elevation in the direction of the arrows V—V in FIG. 6;

FIG. 6 is a view of this disc in section on the line VI—VI in FIG. 5;

FIG. 11 is a similar view to FIG. 10 but relates to a modified embodiment in which the end of the foot is adapted to be folded over laterally, this end being shown before being folded over;

FIG. 12 is a corresponding partial view showing the end of the foot after it has been folded over;

FIG. 13 relates to another modified embodiment in which the end of the foot is adapted to be folded over both frontally and laterally, this end being shown before being folded over;

FIG. 14 is a corresponding view showing the end of the foot after it has been folded over; and FIG. 15 is a view of the foot in the direction of the arrow XV in FIG. 14.

DESCRIPTION OF THE PREFERRED EMBODIMENTS

Figure 7:
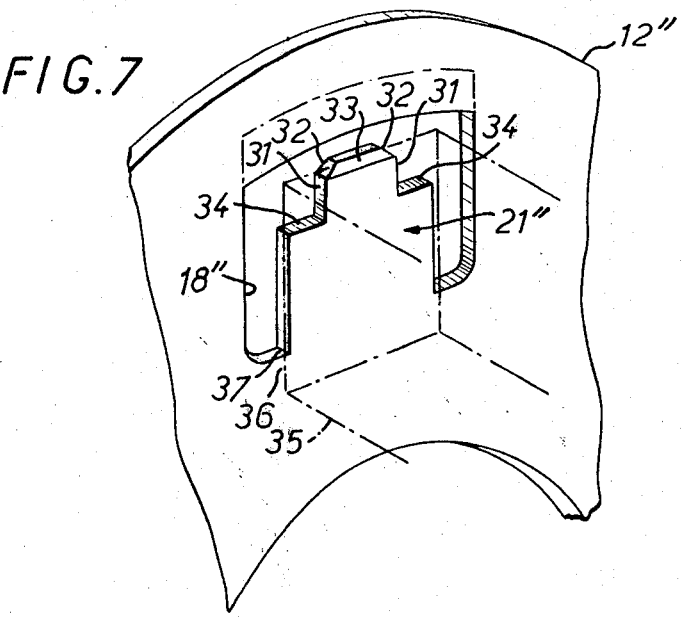
FIG. 7 is a partial view on a larger scale and in perspective of the plate in which the feet are formed, before stamping for the purpose of folding over the feet.
Figure 8:
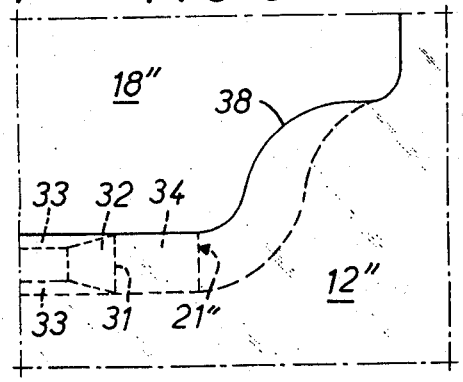
FIG. 8 is a rear half-view of a foot after folding over, in the direction of the arrow VIII in FIG. 9.
Figure 9:
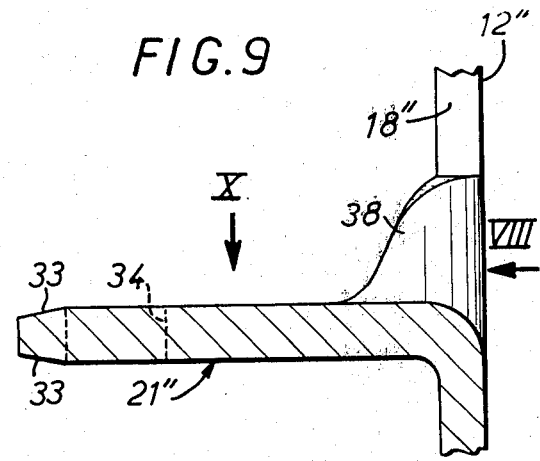
FIG. 9 is a side view of this foot in section on the line IX—IX in FIG. 8.

In the embodiment shown in FIGS. 1 to 4 a clutch friction disc comprises (FIGS. 1 and 2) a central driving plate 10 rigidly fastened to a central hub 11, and lateral plates 12 and 13 disposed one on each side of the plate 10 and rigidly fastened to a plate 14 of larger diameter which carries peripheral friction linings 15 and 16.

Windows 17 are provided in the plate 10 radially of the hub, while corresponding windows 18 and 19 are provided in the plate 12 and in the plate 13 respectively. The various windows 17, 18 and 19 are located opposite one another and receive damping springs 20 for rotationally coupling the hub 11 and the friction linings 15 and 16.

The lateral plates 12 and 13 are interconnected by braces (FIGS. 3 and 4), which consist of three feet 21 formed in the plate 12 and of three feet 22 formed in the plate 13 and alternating with the feet 21.

The feet 21 are adapted to be engaged in slots 23 in the plate 13, while the feet 22 are adapted to be engaged in slots 24 in the plate 12, the connection being completed by an operation of treating the ends of the feet. This operation consists for example of hammering, twisting, folding, brazing or welding.

Each foot 21 or 22 is formed from part of the material of the plate which is removed when a window 18 or 19 is formed.

More particularly, the part of the material of a window 19 serving to form a foot 22 can be seen at 22A, this foot being made by simply folding over this part 22A.

Each foot 21 or 22 has a channel-shaped body 25 with raised sides 26 (FIG. 2), and a narrower, flat end 27 adapted to engage in the slot formed in the other lateral plate which is then hammered over to lock the two plates 12 and 13 together.

The windows 17 of the central plate 10 have an axial extension 28, thus forming a passage for the brace feet 21 and 22.

It will be appreciated that the connection of two plates 12 and 13 by means of the feet 21 and 22 is very strong and permits a standardised construction for the plates 12 and 13. In addition, a construction of this kind enables elements or material to be saved in comparison with constructions in which the plates 12 and 13 are, for example, joined by pillars.

As can be seen in FIG. 2, the width of the feet 21 and 22 in relation to the width of the extensions 28 in the central plate 10 allows a circumferential play between the plates which defines an angular deflection of the linings 15 and 16 in relation to the hub 11, against the action of the springs 20.

In the modified embodiment illustrated in FIGS. 5 to 10, a clutch friction disc is provided with a torsionally resilient connection similar to that described with reference to FIGS. 1 to 4. The same reference numerals are used to designate similar elements, but these numerals are followed by a double prime.

Whereas in FIGS. 1 to 4 the friction disc 14 is separate from the lateral plate 13, the disc 14", which carries the linings 15" and 16", itself has slots 23", and all the feet 21" are formed in the plate 12" and engaged in these slots 24". Thus the disc 14", which is of thin spring steel and which includes a progressivity device 30 associated with the linings 15" and 16", does not have to withstand the folding operation. The plate 12" in which the feet 21" are formed, can be as thick as desired in order to give the feet 21" sufficient strength.

Each foot 21" is formed (FIG. 7) in coplanar manner in the plate 12", being cut out at the location of a window 18" which receives the torsion damping spring 20".

The end 31 of the foot 21" (FIGS. 7 to 10) is bevelled across its width at 32 and is likewise of reduced thickness at 33. This reduction in thickness results from the press coining of the plate 12". The end 31 is separated from the remainder of the plate 12" by a shoulder 34.

The foot 21" is folded over at 90° by a stamping operation in which a punch 35 (indicated in dot-and-dash lines) acts on the foot projection at 36 beyond the root 37 of the foot, to form two side gussets 38 stiffening the foot. It will be noted that the remainder of the folded-over foot beyond the gussets 38 is substantially flat.

The ends 31 of the feet 21" are engaged in the slots 23" in the disc 14" with a clearance 39 (FIG. 10) which facilitates assembly. The ends 31 are then folded over frontally at 40 (FIG. 6) behind the disc 14" in order to effect locking. This folding-over has the effect of taking up the play 39 and tightly locking the assembly together.

Figure 10:
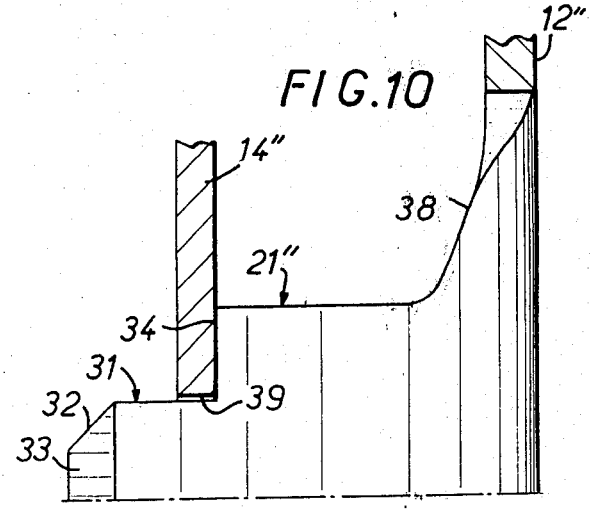
FIG. 10 is a top half-view of the said foot in the direction of the arrow X in FIG. 9.

In the modified embodiment illustrated in FIGS. 11 and 12, the ends 31 of the feet 21" are adapted to be folded over, for locking purpose, laterally and not frontally as in FIG. 10. For this purpose the end 31 of the foot 21" contains (FIG. 11) a recess 41 forming two horns 42. It is these horns 42 that are folded over laterally, as shown at 43 in FIG. 12.

In another modified embodiment (FIGS. 13 to 15), the ends 31 of the feet 21" are adapted to be folded over for locking purposes both frontally at 40, as in FIG. 10, and laterally at 43, as in FIGS. 11 and 12. For this purpose the end 31 of the foot 21" has a central portion 44 adapted to be folded over frontally at 40 and two lateral horns 45 adapted to be folded over laterally at 43.

I claim:

1. A torque-transmitting, torsionally resilient coupling comprising a central plate formed with a plurality of radially-disposed openings, a pair of interconnected lateral plates which are disposed one on each side of the central plate for angular displacement relative thereto and which are provided with corresponding windows facing the openings in the central plate, and spring means located in said windows and said openings to form a torsionally-resilient coupling between the lateral plates and the central plate, the lateral plates being interconnected by feet formed integrally on one or each lateral plate and which are engaged in the other lateral plate, the material from which each of said feet are formed being provided by part of the material removed from the plate to form a window therein.

2. A coupling as claimed in claim 1, wherein said feet are engaged in sockets formed in the other lateral plate.

3. A coupling as claimed in claim 2, wherein said sockets comprise slots.

4. A coupling as claimed in claim 1, wherein said feet are provided in both of the lateral plates in an alternating arrangement.

5. A coupling as claimed in claim 4, wherein the two lateral plates are identical.

6. A coupling as claimed in claim 1, wherein the openings in the central plate which receive the spring means are provided with radial, axially-directed extensions, and the feet of the lateral plates pass through the said extensions.

7. A coupling as claimed in claim 1, wherein said feet have a channel-shaped body and a flat end of reduced width for engaging in the other lateral plate.

8. A coupling as claimed in claim 7, wherein said end is used to lock the connection of the two lateral plates.

9. A coupling as claimed in claim 1, wherein said feet are formed in only one of the lateral plates and are engaged in slots provided in the other lateral plate.

10. A coupling as claimed in claim 8, wherein the ends of the feet are adapted to be folded over for locking purposes.

11. A coupling as claimed in claim 10, wherein the ends of the feet are adapted to be folded over frontally for locking purposes.

12. A coupling as claimed in claim 10, wherein the ends of the feet are adapted to be folded over laterally for locking purposes.

13. A coupling as claimed in claim 10, wherein the ends of the feet are adapted to be folded over both frontally and laterally for locking purposes.

14. A coupling as claimed in claim 10, wherein the ends of the feet are engaged in slots formed in the corresponding lateral plate which slots are made slightly wider than said ends prior to assembly in order to provide play which, after assembly, is taken up by the effect of folding over said ends.

15. A coupling as claimed in claim 1, wherein the feet are preformed in a coplanar manner in the corresponding plate and are folded over at 90° by a stamping operation in which a punch is used which extends beyond the root of the foot so as to form two lateral stiffening gussets.

16. A coupling as claimed in claim 15, wherein the remaining portion of the folded-over foot beyond the said gusset is substantially flat.

17. A coupling as claimed in claim 15, wherein the ends of the feet are bevelled over their width and are of reduced thickness.

18. A coupling as claimed in claim 17, wherein the reduced thickness is obtained by press coining the corresponding plates.

19. A coupling as claimed in claim 1, wherein the coupling is a clutch assembly and one of the lateral plates is provided with friction linings, and the central plate is connected to a driving hub.

20. A coupling as claimed in claim 19, wherein the lateral plate carrying the said friction linings is provided with slots engaged by the feet formed in the other lateral plate.

* * * * *